(12) United States Patent
Beutin et al.

(10) Patent No.: US 10,167,740 B2
(45) Date of Patent: Jan. 1, 2019

(54) TURBINE ENGINE HAVING AN ELEMENT FOR DEFLECTING FOREIGN OBJECTS

(71) Applicant: SAFRAN AIRCRAFT ENGINES, Paris (FR)

(72) Inventors: Bruno Albert Beutin, Evry (FR); Nuria Llamas Castro, Savigny sur Orge (FR); Bruna Ramos, Seine-Port (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 833 days.

(21) Appl. No.: 14/452,959

(22) Filed: Aug. 6, 2014

(65) Prior Publication Data

US 2015/0300208 A1  Oct. 22, 2015

(30) Foreign Application Priority Data

Aug. 9, 2013 (FR) ..................... 13 57944

(51) Int. Cl.
*F02C 7/05* (2006.01)
*F01D 25/32* (2006.01)
(Continued)

(52) U.S. Cl.
CPC ............. *F01D 25/32* (2013.01); *F01D 25/24* (2013.01); *F02C 7/05* (2013.01); *F02C 7/052* (2013.01);
(Continued)

(58) Field of Classification Search
CPC .. F02C 7/05; F02C 7/052; F02C 7/055; F01D 25/03; B64D 2033/0246; B64D 2033/0286
See application file for complete search history.

(56) References Cited

U.S. PATENT DOCUMENTS 3,977,811 A    8/1976   Kuintzle, Jr.
4,456,458 A *   6/1984   Gilbertson ............. B01D 45/04
                                                                  244/53 B
(Continued)

FOREIGN PATENT DOCUMENTS

EP      1 555 406 A1    7/2005
FR      2 951 504 A1    4/2011
(Continued)

OTHER PUBLICATIONS

French Preliminary Search Report dated May 19, 2014, in Patent Application No. FR 1357944, filed Aug. 9, 2013 (with English Translation of Category of Cited Documents).

*Primary Examiner* — Jason Shanske
*Assistant Examiner* — Michael Sehn
(74) *Attorney, Agent, or Firm* — Oblon, McClelland, Maier & Neustadt, L.L.P.

(57) ABSTRACT

A turbine engine having a nacelle is provided. The nacelle includes, upstream, an air intake fairing and an element for deflecting foreign objects which defines with the fairing an air intake flow path for supplying air to two coaxial flow paths which are a radially inner flow path and a radially outer flow path. The outer flow path being is by a hub housing and scoops, the hub housing and the scoops being installed downstream of the element for deflecting objects. Each scoop includes two independent portions which are an upstream portion borne by the hub housing, and a downstream portion borne by the nacelle.

8 Claims, 3 Drawing Sheets

(51) Int. Cl.
*F02K 3/062* (2006.01)
*F02K 3/072* (2006.01)
*F02C 7/052* (2006.01)
*F01D 25/24* (2006.01)
*F02C 7/055* (2006.01)
*B01D 45/16* (2006.01)

(52) U.S. Cl.
CPC .............. *F02K 3/062* (2013.01); *F02K 3/072* (2013.01); *B01D 45/16* (2013.01); *F02C 7/055* (2013.01); *F05D 2220/30* (2013.01)

(56) References Cited

U.S. PATENT DOCUMENTS

| | | | | |
|---|---|---|---|---|
| 5,044,153 | A | * | 9/1991 | Mouton ................. F02C 7/052 415/121.2 |
| 5,269,135 | A | * | 12/1993 | Vermejan ................. F02C 7/04 60/226.1 |
| 5,339,622 | A | * | 8/1994 | Bardey ................. F01D 25/32 415/169.2 |
| 7,690,595 | B2 | * | 4/2010 | Leland ................. B64D 33/02 137/15.1 |
| 7,891,163 | B2 | * | 2/2011 | Richards ................. F02C 7/052 60/226.1 |
| 9,091,207 | B2 | * | 7/2015 | Chanez ................. F02C 7/05 |
| 2005/0150970 | A1 | | 7/2005 | Beutin et al. |
| 2012/0207594 | A1 | | 8/2012 | Chanez et al. |
| 2014/0119903 | A1 | * | 5/2014 | Suciu ................. F02C 7/052 415/177 |

FOREIGN PATENT DOCUMENTS

| | | | |
|---|---|---|---|
| FR | 2 951 504 B1 | 4/2011 | |
| FR | 2 951 503 B1 | 11/2011 | |
| GB | 1098058 | 1/1968 | |
| WO | 2011/045373 A1 | 4/2011 | |
| WO | WO 2011045373 A1 * | 4/2011 | ................ F02C 7/05 |

* cited by examiner

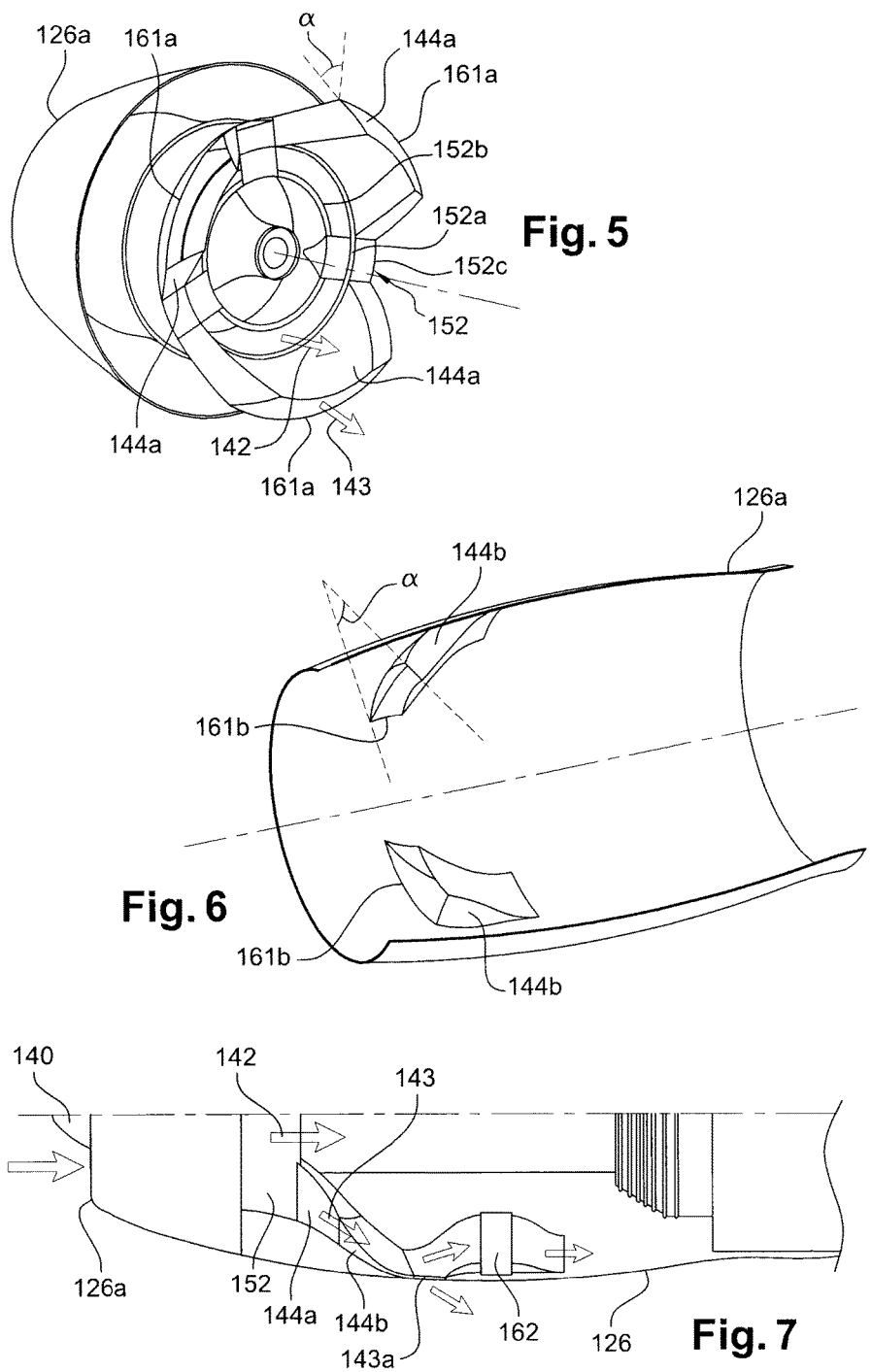

TURBINE ENGINE HAVING AN ELEMENT FOR DEFLECTING FOREIGN OBJECTS

TECHNICAL FIELD

The present invention relates to a turbine engine having an element for deflecting foreign objects.

PRIOR ART

Generally speaking, a turbine engine comprises a gas generator formed of one or more sets of rotors rotating about the same axis. Each set, known as a "stage", is composed of a compressor and a turbine, which are usually connected by a shaft or a journal and arranged one upstream and one downstream of a combustion chamber relative to the flow of the gas streams in the engine. A fan, or a single or multiple propeller, is associated with this gas generator, by which it is driven.

When the rotor of the fan or of the propeller is arranged in front of the engine, the air inlet of the generator is located downstream of the propeller. At least some of the foreign bodies—such as birds, hail, water or stones—likely to be drawn in by the generator are slowed down or stopped by the front rotor, which, due to its inertia and size, partially forms a screen. Said foreign bodies may also be deflected by the centrifugal effect of the fan towards the secondary flow path. This protection does not exist on engines of which the fan rotor or propeller rotor is not placed upstream of the air inlet of the gas generator.

Thus, this is the case for an engine that has non-faired propellers, also known as an "unducted fan", "UDF" or "open rotor". This type of engine comprises a doublet of contra-rotating propellers, arranged radially outside the nacelle surrounding the generator. These propellers are driven either directly by two turbine wheels, or by one or more power turbine stages, via a differential reduction gear.

For this type of engine, it is known, in particular from patents FR-B1-2 951 503 and FR-B12 951 504, to equip the turbine engine with an element for deflecting foreign objects, which protects the engine against ingesting these objects, while maintaining the aerodynamic performance of the nacelle.

In these patents, the deflection element defines, together with the air intake fairing of the nacelle, an air intake flow path for supplying air to two coaxial flow paths, namely a radially inner and a radially outer flow path. The outer flow path is defined by a hub housing and scoops installed downstream of this housing. The scoops are attached to nacelle cowls which are, for example, articulated to the strut for suspending the turbine engine to an aircraft. In the installation position (cowls of the nacelle in the closed position), the upstream ends of the scoops cooperate to maintain the seal with the downstream end of the hub housing by means of joints. However, this seal may be inadequate. Indeed, in operation, owing to relative movement between the hub housing and the scoops (which are not rigidly connected to the housing), air leaks may occur between the housing and the scoops.

A solution to this problem might be to attach the scoops to the hub housing instead of to the nacelle. However, this solution would be unsatisfactory since the scoops would be cantilevered to the housing and it would be difficult if not impossible to access the equipment located between the scoops and the engine housing, even if all the cowls were to be removed from the nacelle.

The present invention proposes another simple, effective and economical solution to the aforesaid problem and can be deemed an improvement to the prior art.

DESCRIPTION OF THE INVENTION

The invention proposes a turbine engine having a nacelle comprising an air intake fairing and an element for deflecting foreign objects which defines with said fairing an air intake flow path for supplying air to two coaxial flow paths, namely a radially inner and a radially outer flow path, said outer flow path being defined by a hub housing and scoops, said hub housing and said scoops being installed downstream of the housing, characterised in that each scoop comprises two independent portions: an upstream portion borne by the housing and a downstream portion borne by the nacelle.

The invention overcomes the issue of the seal between the hub housing and the scoops since an upstream portion of each scoop is borne by or attached to this housing. The upstream portion of each scoop can be cantilevered to the hub housing. This upstream portion of course has a smaller length or axial dimension than that of the scoop in its entirety. It is therefore relatively easy to access the equipment of the turbine engine in the vicinity of the scoops on the engine housing, during a maintenance operation for example. The invention further allows the scoops to be stiffened by means of dual attachment, versus single attachment in the prior art.

The upstream and downstream portions of the scoops can be attached to the hub housing and to the nacelle respectively, by any appropriate means and for example by bolts, welding, brazing, bonding, etc.

The downstream portion of each scoop is preferably attached to a detachable cowl of the nacelle. Thus, when this cowl is retracted or moved from a closed position to an open position, the downstream portion of the scoop or of each of the scoops rigidly connected to this cowl is moved further away from the corresponding upstream portion.

Advantageously, sealing means are installed between the upstream and downstream portions of each scoop. The sealing means of each scoop may comprise a joint that is compressed upon installation between a downstream peripheral edge of the upstream portion and an upstream peripheral edge of the downstream portion.

Preferably, the upstream and downstream portions of each scoop are installed substantially end to end in a sealing plane which forms a non-zero angle with a plane perpendicular to the longitudinal axis of the turbine engine. This inclined sealing plane limits the risk of air leaks between the portions of the scoops in the event of relative movement occurring between these portions. In addition, if a sealing joint were to be compressed between the ends opposite the scoop portions, the joint would be subjected to compression rather than shearing, and this would improve the effectiveness of the seal and lengthen the service life of the joint.

An air/oil exchanger may be installed in the nacelle and comprise an air circuit supplied by the outlet of at least one of the scoops.

There are, for example, three scoops. The scoops are preferably spaced apart and uniformly distributed about the longitudinal axis of the turbine engine.

The present invention also relates to a scoop for a turbine engine as described above, characterised in that it comprises two independent portions: an upstream portion configured for attachment to a hub housing and a downstream portion configured for attachment to the nacelle of the turbine engine.

Advantageously, one of the upstream and downstream portions of the scoop bears sealing means configured for compression between these portions, in the installation position.

DESCRIPTION OF THE FIGURES

The invention will be better understood and other details, features and advantages of the invention will become apparent upon reading the following description, given by way of non-limiting example, with reference to the accompanying drawings, in which:

FIG. 5 is another partial schematic perspective view of the turbine engine in FIG. 3, viewed from downstream and from the side;

FIG. 6 is a schematic perspective view of a cowl of the nacelle of the turbine engine in FIG. 3; and FIG. 7 is a schematic perspective half view of the turbine engine in FIG. 3.

DETAILED DESCRIPTION

Figure 1:
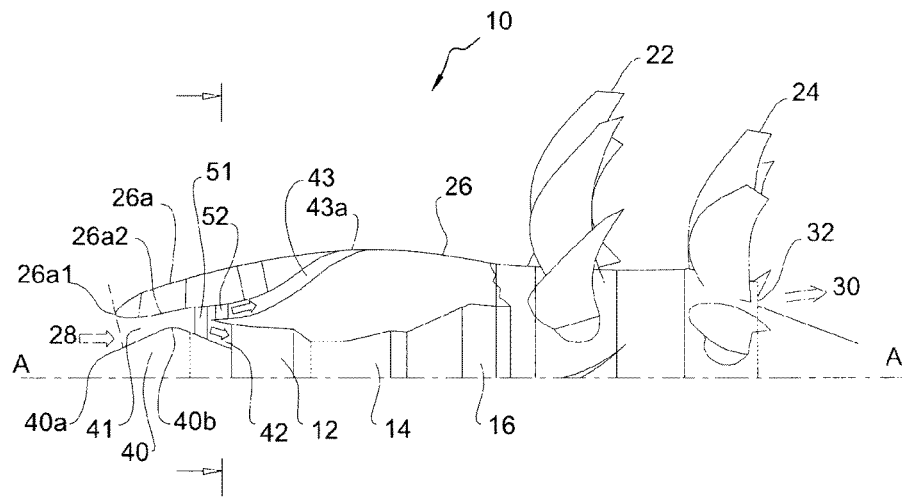
FIG. 1 is a schematic half view in axial section of a turbine engine.

Reference is made first of all to FIG. 1, which shows the main components of a turbine engine 10 having non-faired propellers according to the art prior to the invention. The turbine engine 10 has, from upstream to downstream, in the direction in which the gases flow inside the turbine engine, a compressor 12, an annular combustion chamber 14, and a high-pressure turbine 16, of which only the enclosing housings can be seen. Downstream of the high-pressure turbine 16 are arranged either two low-pressure turbines (not shown) which are contra-rotating, or one or more turbine stages which, by means of a differential reduction gear, drive the propellers in a contra-rotating manner. "Contra-rotating" means that they rotate in two opposite direction about the longitudinal axis A of the engine.

In the example shown in FIG. 1, each of these downstream turbines is connected for conjoint rotation to an outer propeller 22, 24 extending radially outside the nacelle 26 of the turbine engine. In another embodiment having one or more turbine stages, the differential reduction gear can drive each propeller stage. The nacelle 26 is substantially cylindrical and extends along the axis A from the from the air inlet around the compressor 12, the combustion chamber 14 and the turbines.

The air flow 28 that enters the engine is compressed and then mixed with fuel and burnt in the combustion chamber 14. The combustion gases then pass into the turbines to drive the propellers 22, 24 in rotation, said propellers providing most of the thrust generated by the turbine engine. The combustion gases leaving the turbines are discharged through a nozzle 32 (arrows 30) in order to increase the thrust.

The propellers 22, 24 are arranged coaxially one behind the other and have a plurality of vanes which are uniformly distributed about the axis A of the turbine engine. These vanes extend substantially radially and are in particular of the variable pitch type; that is, they can rotate about their axes in such a way as to optimise their angular position according to the operating conditions of the turbine engine. The invention may also apply to non-variable pitch vanes.

The nacelle 26 comprises an annular air intake fairing 26a, upstream, which forms the air inlet. An element 40 for deflecting foreign objects is arranged inside the air intake fairing 26a. Together with the inner wall 26a2 of the air intake fairing 26a, said element defines an annular air intake flow path 41 for the engine.

The deflection element 40 is in the shape of a generally ovoid bulb, the axis of which is co-linear with the axis A of the engine. An apex 40a of the ovoid points upstream from the upstream rim 26a1 of the fairing 26a. The deflection element 40 has a maximum diameter over its expanded portion at 40b downstream of the rim 26a1.

The deflection element 40 is in this case supported by a first hub housing 51 of which the arms radiate between an inner hub 51in attached to the deflection element 40 and an outer collar 51ex. The first hub housing 51 is in turn supported by a second hub housing 52 arranged downstream. This second housing 52 is attached to the engine, for example to the housing of the compressor 12, and also comprises arms which radiate between an inner hub 52in attached to the deflection element 40 and an outer collar 52ex.

Downstream of the expanded portion 40b, the air intake flow path 41 widens and splits into two coaxial annular flow paths: a radially inner main or primary flow path 42 and a radially outer secondary flow path 43. The primary flow path 42 leads to the inlet of the compressor 12 and supplies the engine with primary air. The secondary flow path 43 makes its way inside the nacelle 26, externally to the various housings of the engine. It is in communication with the wall of the nacelle 26 via openings 43a therein.

The hub 52in and the collar 52ex of the second housing 52 define between them an annular channel which forms an upstream portion of the secondary flow path 43 and is divided by the arms of this second housing into four segments.

Figure 2:
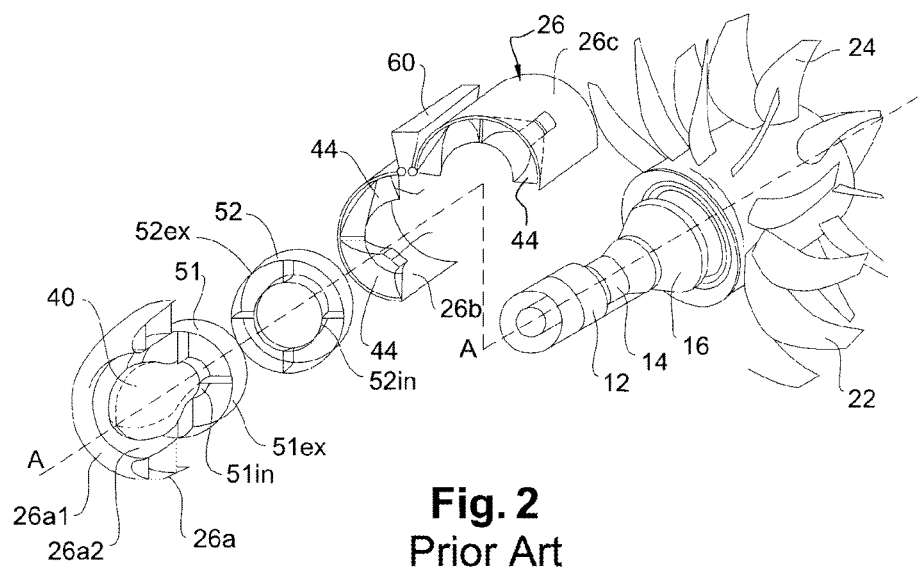
FIG. 2 is a schematic perspective view, which has been partially exploded, of the turbine engine in FIG. 1, viewed from upstream and from the side.

FIG. 2 is an exploded perspective view of the assembly in FIG. 1. The nacelle 26 comprises, downstream of the air intake fairing 26a, two substantially semi-cylindrical cowls 26b and 26c, which are articulated to the strut 60 which attaches the assembly to the aircraft. The cowls 26b, 26c are each articulated about an axis parallel to the axis A of the engine. Each cowl 26b, 26c bears two scoops 44 in this case. The scoops 44 are portions of the secondary channel 43 and extend from the second housing 52 to the openings 43a in the nacelle 26.

Each cowl 26b, 26c is movable about the aforesaid axis from an open position, shown in FIG. 2, to a closed position in which the scoops 44 it bears are each in fluid communication with a segment of the annular channel, extending between two adjacent arms of the second housing 52.

As explained in the foregoing, the present invention proposes an improvement to the technology described above.

FIGS. 3 to 7 show an embodiment of the invention which differs from the prior art in particular in that each scoop is produced in two independent portions, namely an upstream and a downstream portion, the upstream portion of the scoop being borne by a hub housing and its downstream portion being borne by the nacelle.

As in the case described above, the turbine engine 110 is of the type having non-faired propellers and has an engine surrounded by a nacelle 126. Upstream, the nacelle 126 comprises an annular air intake fairing 126a which surrounds an element 140 for deflecting foreign objects and defines an annular air intake flow path therewith.

A hub housing 152 is mounted downstream of the deflection element 140 and in this case comprises a hub 152a and two collars 152b, 152c, which are coaxial with the hub 152a and extend inside and outside said hub respectively. The collars 152b, 152c are connected to each other and to the hub 152a by radial arms. The hub 152a defines, together with the inner collar 152b, an inner annular channel forming an upstream portion of the primary flow path 142 and, together with the outer collar 152c, an outer annular channel forming an upstream portion of the secondary flow path 143. Each of these annular channels is divided by the arms of the housing 152 into segments. As can be seen in the drawings, these arms have a specific circumferential dimension, and this means that the segments of each channel are spaced apart in the circumferential direction. In the example shown, the housing 152 comprises three radial arms and therefore three segments of each annular channel.

Downstream of the air intake fairing 126a, the nacelle 126 comprises two articulated, substantially semi-cylindrical cowls 126b and 126c which are movable from an open position to a closed position, as described in the foregoing.

According to the invention, each scoop 144 is produced in two independent portions, namely an upstream portion 144a and a downstream portion 144b, the upstream portion 144a of the scoop being attached to the housing 152 and its downstream portion 144b being attached to one of the cowls 126b, 126c of the nacelle.

By way of example, there are three scoops 144 in this case. Here they have an identical profile and are uniformly distributed about the engine axis. In other embodiments, the scoops may be adapted to different constraints, be it in terms of their positioning, distribution or number.

Each scoop 144 comprises four walls: two walls, namely the inner and outer wall, which are substantially in the shape of portions of a cylinder, and two lateral walls. The inner and outer wall of each scoop 144 extend downstream and outward in continuation of the hub 152a and of the outer collar 152c of the housing 152. The lateral walls of each scoop 144 extend downstream in continuation of the lateral walls opposite two adjacent arms of the housing 152.

Each scoop 144 defines a passage cross section which gradually decreases from upstream to downstream. This decrease in cross section brings about an increase in the speed of the air in the secondary flow path 143. In this manner, on the one hand air is prevented from being ingested by the outlet openings 143 of the secondary channel 143 and on the other hand the air stream participates in propulsion.

Owing to the separation of each scoop 144 into two independent portions, each of the aforesaid walls of each scoop comprises an upstream portion and a downstream portion.

Figure 3:
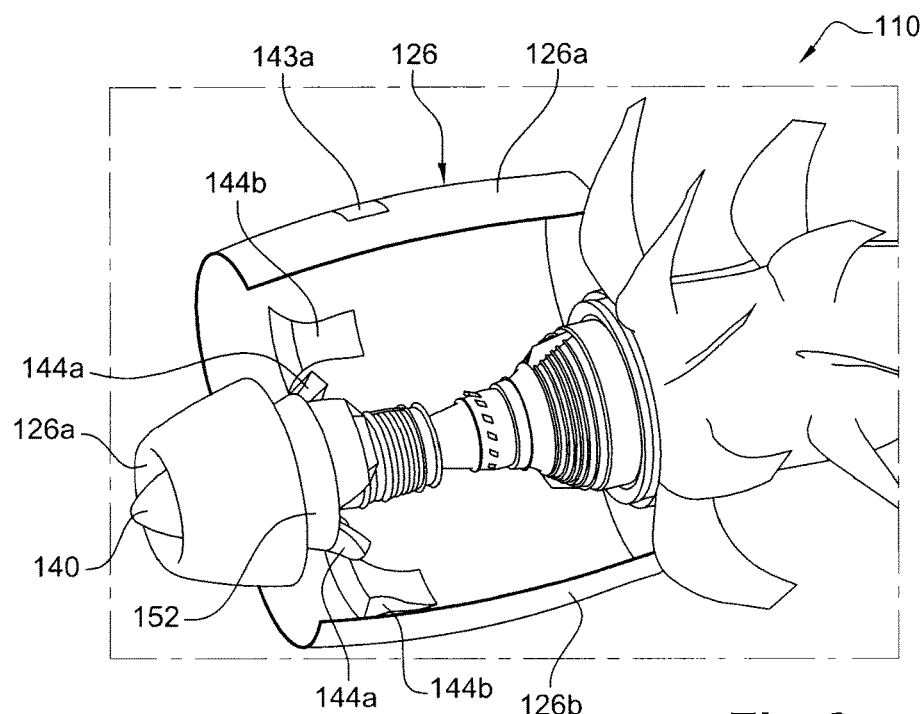
FIG. 3 is a schematic perspective view of a turbine engine according to the invention, viewed from the side, the cowls of the nacelle being in the open position.

The upstream end of the upstream portion of each scoop 144 is attached by appropriate means (for example by bolting) to the downstream end of the housing 152. This upstream portion is thus cantilevered to the housing 152 (FIG. 3). In this attachment position, each segment of the outer channel of the housing 152 is in fluid communication with the inner passage of an upstream scoop portion 144.

Figure 4:
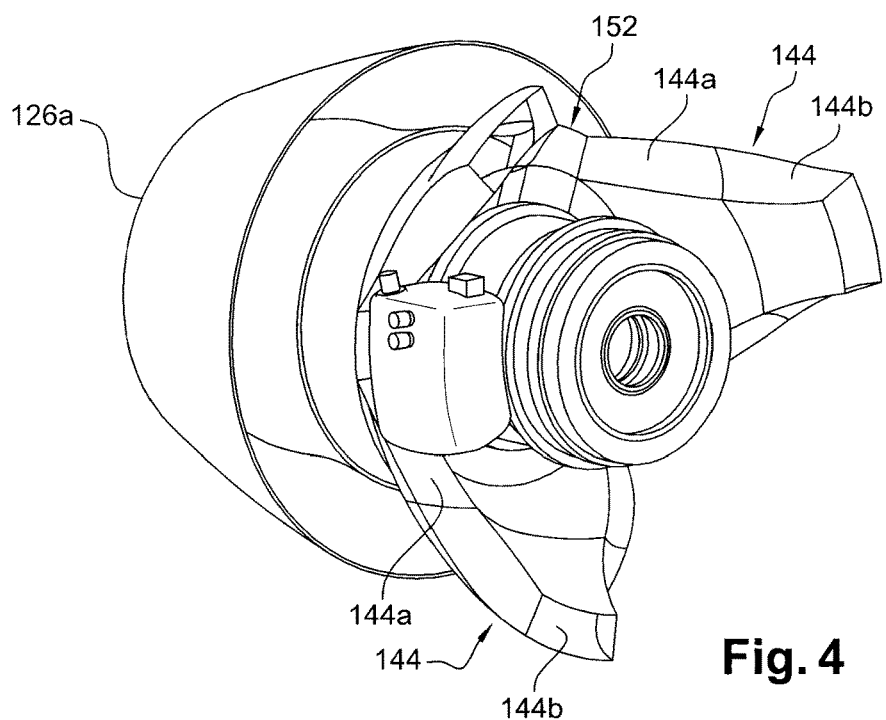
FIG. 4 is a partial schematic perspective view of the turbine engine in FIG. 3, from downstream and from the side.

The downstream end of the downstream portion of each scoop 144 is attached by appropriate means (for example by bonding) to the nacelle 126, such that the inner passage of this downstream portion is in fluid communication with an opening 143a in the nacelle. The downstream portions of the scoops 144 are thus rigidly connected to the cowls 126, 126c of the nacelle 126 and are movable from an open position of the nacelle, shown in FIG. 3, in which the upstream and downstream portions of the scoops are at a distance from each other, and a closed position of the nacelle in which the upstream and downstream portions of the scoops are arranged end to end (FIG. 4). In this last position, the downstream portion 144b of each scoop 144 extends in continuation of the upstream portion 144a of this scoop and the upstream end of the downstream portion cooperates to maintain the seal with the downstream end of the upstream portion so as to limit, or even prevent, air leaks between these portions.

To achieve this, sealing joints, such as lips seals, are inserted between the upstream portion 144a and the downstream portion 144b of the scoops. A peripheral joint 161a may, for example, extend over the entire periphery of the peripheral edge of the downstream end of the upstream portion 144a of the scoop (FIG. 5), this joint being intended for compression upon installation by bearing on the peripheral edge of the upstream end of the downstream portion 144b of this scoop. As either a variant or an additional feature, a peripheral joint 161b may extend over the entire periphery of the peripheral edge of the upstream end of the downstream portion 144b of the scoop (FIG. 6), this joint being intended for compression upon installation by bearing on the peripheral edge of the downstream end of the upstream portion 144a of this scoop.

Advantageously, the sealing plane between the upstream portion 144a and the downstream portion 144b of each scoop 144, that is, the mating plane or plane of contact of these portions, is inclined relative to a transverse plane (FIG. 5). This sealing plane forms an angle α of at least 5° (and at most 90°) for example with a transverse plane.

In operation, relative movement may occur between the upstream and downstream portions of the scoops 144. Owing to the inclination of the sealing plane, relative axial and/or radial movement will predominantly compress the sealing joints 161a, 161b, thus ensuring a good seal.

As can be seen in FIG. 4, separation of the scoops 144 into two independent portions, namely an upstream and a downstream portion, makes it possible to facilitate access to the equipment 164 attached to the engine housing in the vicinity of these scoops.

FIG. 7 shows a particular embodiment of the invention in which an air/oil exchanger 162 is installed inside the nacelle 126, downstream of the scoops 144, and the outlet of one of these scoops supplies an air circuit of this exchanger 162.

When the turbine engine is in operation, foreign objects are deflected as follows: a foreign object is sucked in by the air inlet of the turbine engine and strikes the deflection element 140, against which it ricochets. Its trajectory is deflected towards the inner wall of the intake fairing. Downstream of the expanded portion of the deflection element, the object is directed towards one of the scoops 144 of the secondary flow path, from where it is guided outward, through the opening 143a. If, by ricocheting, it is sucked into the main channel, it has advantageously lost enough energy not to damage the engine.

The invention claimed is:

1. A turbine engine comprising:

a nacelle comprising, at an upstream end, an air intake fairing and a deflection element which deflects foreign objects, the air intake fairing and the deflection element defining an air intake flow path for supplying air to two coaxial flow paths which are a radially inner flow path and a radially outer flow path, said outer flow path being defined by a hub housing and scoops, said hub housing and said scoops being fitted downstream of the deflection element, wherein the hub housing comprises a hub and an outer collar extending outside the hub and coaxial with the hub, the outer collar being connected to the hub by radial arms of the hub housing, wherein an upstream portion of the outer flow path is defined by the hub and the outer collar, wherein each scoop comprises an inner cylindrical wall, an outer cylindrical wall, and two lateral walls connecting the inner cylindrical wall and the outer cylindrical wall, the inner cylindrical wall extending downstream and outward in continuation of the hub, and the outer cylindrical wall extending downstream and outward in continuation of the outer collar, wherein each scoop comprises an upstream portion attached to the hub housing and a downstream portion attached to the nacelle, the upstream portion and the downstream portion being independent and separable from each other, wherein a downstream end of the upstream portion includes an outlet, and an upstream end of the downstream portion includes an inlet, the outlet of the upstream portion and the inlet of the downstream portion each being delimited by the inner cylindrical wall, the outer cylindrical wall, and the two lateral walls such that shapes of the outlet of the upstream portion and the inlet of the downstream portion are the same, and wherein the upstream portion of each scoop is cantilevered to a downstream end of the hub housing, the downstream portion of each scoop is rigidly attached to a movable cowl of the nacelle, and in a first open position of the cowl, the downstream end of the upstream portion and the upstream end of the downstream portion are not in fluid communication with each other, and in a second closed position of the cowl, the downstream end of the upstream portion and the upstream end of the downstream portion abut each other so as to be in fluid communication with each other.

2. The turbine engine according to claim 1, wherein a seal is installed between the upstream and downstream portions of each scoop.

3. The turbine engine according to claim 2, wherein the seal of each scoop includes a joint which is compressed upon installation between a downstream peripheral edge of the upstream portion and an upstream peripheral edge of the downstream portion.

4. The turbine engine according to claim 3, wherein the upstream and downstream portions of each scoop are installed substantially end to end in a sealing plane which forms a non-zero angle with a plane perpendicular to a longitudinal axis of the turbine engine.

5. The turbine engine according to claim 1, wherein an air/oil heat exchanger is installed in the nacelle and comprises an air circuit supplied by an outlet of at least one of the scoops.

6. The turbine engine according to claim 1, comprising three scoops being spaced apart and uniformly distributed about a longitudinal axis of the turbine engine.

7. The turbine engine according to claim 1, wherein one of the upstream and downstream portions of the scoop includes a seal configured for compression between the upstream and downstream portions in the second closed position of the cowl.

8. The turbine engine according to claim 1, wherein the lateral walls extend downstream in continuation of two adjacent radial arms of the hub housing.

* * * * *